May 14, 1929.  T. LARRIGAN  1,712,707
FAUCET
Filed Jan. 12, 1928  2 Sheets-Sheet 1
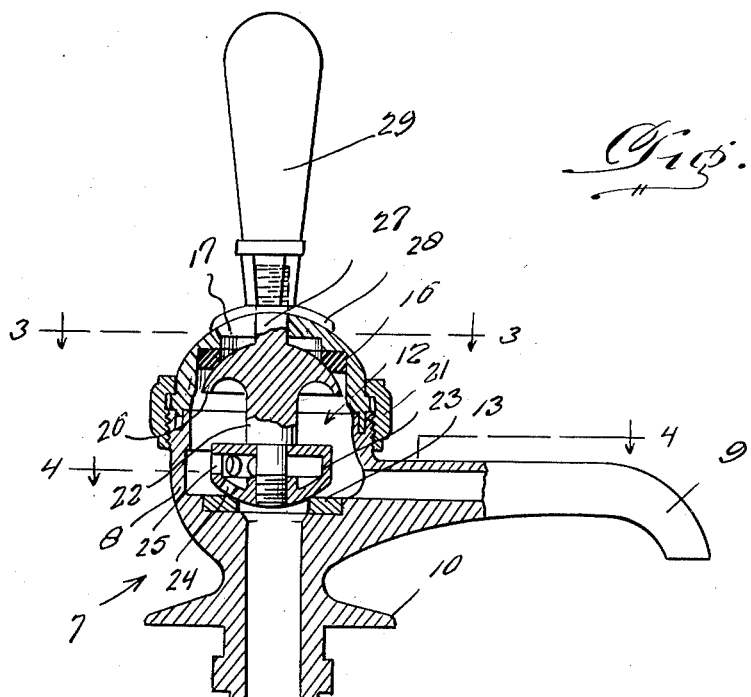
Fig. 1.
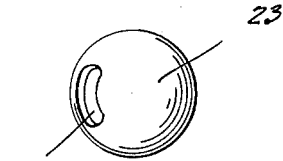
Fig. 5.
Fig. 3.
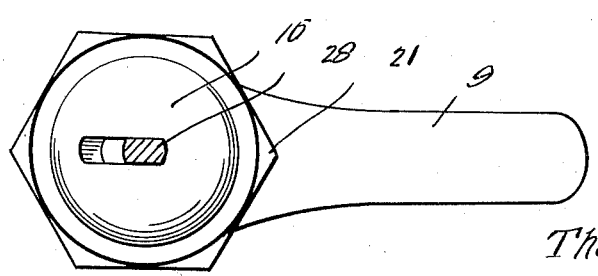
Inventor
Thomas Larrigan,
By Clarence A. O'Brien
Attorney May 14, 1929.  T. LARRIGAN  1,712,707
FAUCET
Filed Jan. 12, 1928   2 Sheets-Sheet 2
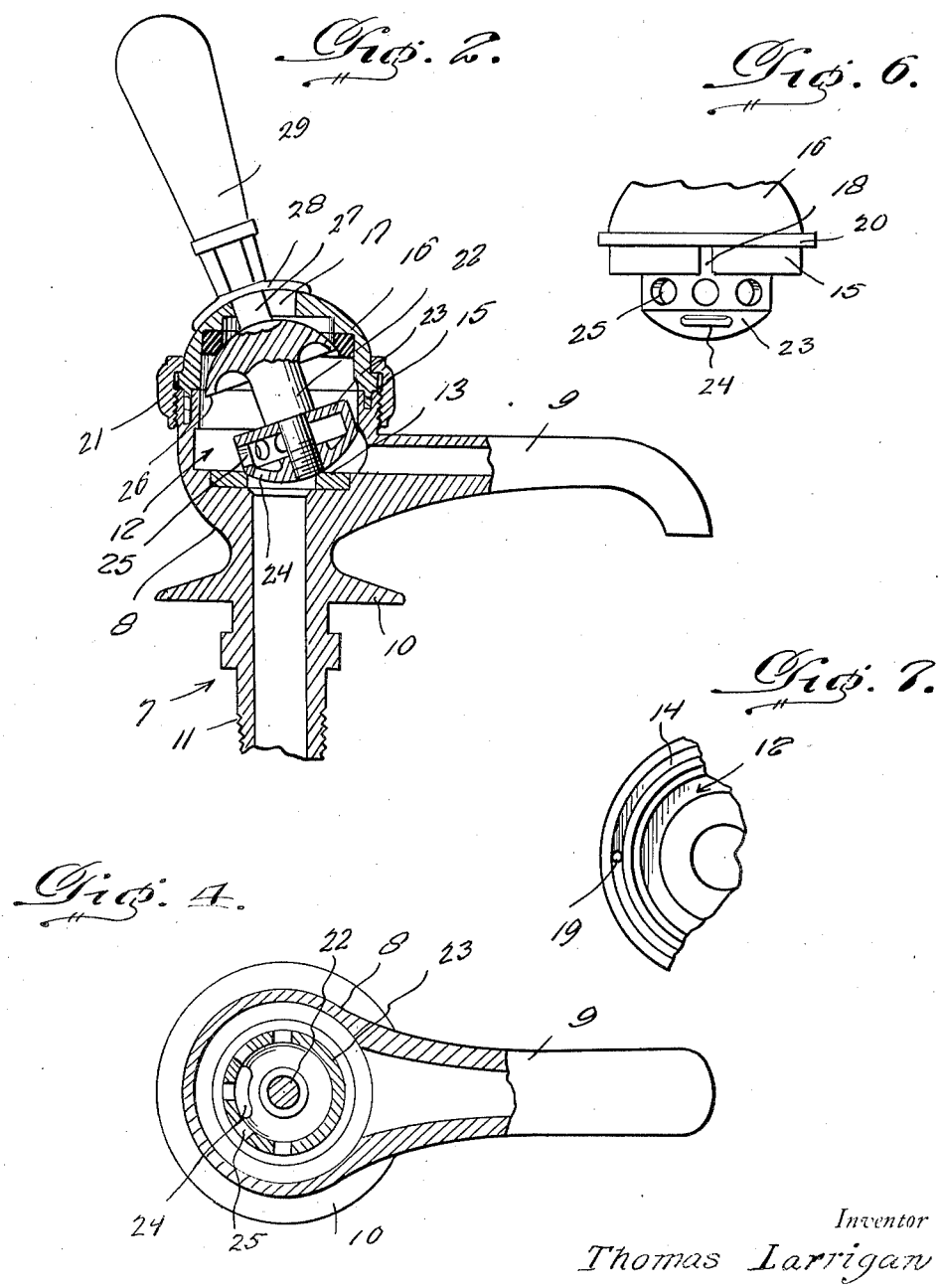
Inventor
Thomas Larrigan
By Clarence A. O'Brien
Attorney Patented May 14, 1929.

1,712,707

UNITED STATES PATENT OFFICE.

THOMAS LARRIGAN, OF KANKAKEE, ILLINOIS.

FAUCET.

Application filed January 12, 1928. Serial No. 246,220.

This invention relates to an improved water faucet or spigot such as is provided for controlling the passage of a stream of water from a supply pipe, the invention being more especially adapted for household use.

My principal aim is to provide a faucet of this class which can be used in association with modern plumbing fixtures without their complete re-arrangement.

A further feature is to provide a structure of this class wherein the parts can be used interchangeably in basin cocks, kitchen sinks, bathroom fixtures, and laundry faucets.

An equally important aim is to provide a faucet of simplified construction, making it economical to manufacture, this being advantageous in that the successful construction of a faucet depends upon its economical manufacture in quantity in order that competition may be met.

A further feature of the invention is to provide a valve or a faucet which is highly efficient in performance, dependable and positive in action, quiet and smooth in operation, and such as to fulfill the requirement of a device of this class.

An important object is to provide a faucet, wherein the construction is such as to permit repairs to be made by unskilled hands with practically no expense, merely by removing and renewing a composition valve seat ring without difficulty.

Another object is to generally improve upon structures of this class by providing one which entirely eliminates springs, clamping bolts, and other parts liable to get out of order and cause leaks.

A still further object is to provide a structure wherein the various parts are made separately, but are standardized, so that they are interchangeable and do not require special machining to be assembled.

Other features and advantages of the invention will become more readily apparent from the following description and drawings.

In the drawings:—

Figure 1 is a side view in section and elevation of a household faucet constructed in accordance with the present invention.

Fig. 2 is a view like Fig. 1, showing the valve open as compared to the closed position shown in Fig. 1.

Figs. 3 and 4 are horizontal sections taken approximately in the planes of the lines 3—3 and 4—4 of Fig. 1.

Fig. 5 is a bottom plan view of the valve head.

Fig. 6 is a fragmentary elevational view showing a peripheral portion of the valve head, and a portion of the casing cap.

Fig. 7 is a fragmentary plan of a portion of the body portion of the casting or casing.

Referring now to the drawings by numerals, it will be seen that the reference character 7 designates what may be generally defined a casting or its equivalent which includes the body portion 8 of the valve casing, the discharge nozzle 9, an outstanding base flange 10, and a screw threaded attaching neck 11 which is adapted to tap into the supply pipe in the customary manner. The body portion 8 is cored out to provide a chamber 12 having a depression or recess in the bottom, to accommodate a renewable and removable composition valve seat washer or ring 13.

The body portion 8 of the valve casing is also externally screw threaded at its top, and is formed in its top with an annular groove or channel 14, telescopically receiving an extension or skirt 15 on the bottom of the valve casing cap 16. This cap is somewhat semi-spherical in design, and formed in its top with an elongated slot 17. It is also to be noted that skirt 15 is notched as at 18 on one side and adapted to cooperate with a retention pin 19 is seen in Fig. 7. The cooperation of the pin 19 extending into the notch 18 however is better shown in Fig. 2.

Obviously, the pin and notch serve to properly position the slot 17 for a purpose to be hereinafter made clear. In connection with the cap 16, it is to be further added, that it is to be provided with an outstanding bead or flange and a retaining ring nut 21 embraces and cooperates with the threads on the body portion 8 to maintain the cap assembled on said body portion.

The valve unit here employed is of special construction and it includes a semi-spherical top 26, a stem 22, and a hollow valve head 23. The top, stem and valve head being made separately and pressed together. The valve head 23, has a convex bottom rockably contacting the valve seat washer 13, and the convex bottom is equipped with a segmental intake opening 24, which may register with the water passage as shown in Fig. 2 or which may be closed against the washer as shown in Fig. 1.

In addition, the valve head is provided with a series of peripheral discharge ports 25. Then too, the valve stem 22 is provided with an outstanding flange 26 of semispherical design which is in movable contact with the interior of the cap 16 as shown in Fig. 2. The upper end portion of the stem which is slightly reduced as at 27, is of polygonal cross section and is slidably mounted in the aforesaid slot 17. This portion of the stem carries an arcuate flat closing plate 28 and a screw threaded pin onto which the handle 39 is removably fastened. Thus, the parts of the valve unit are separable, and as before indicated, they are standardized and therefore interchangeable in order to facilitate assembling and repairs.

It is obvious from the foregoing description that the valve is opened and closed by a rocking motion of the handle. When the handle is straight up as shown in Fig. 1, the valve is closed. However, when the handle is pushed rearwardly or away from the nozzle 9, the valve is opened.

These advantages are prominent in the present invention. The nut which connects the cap and packing ring to the body portion of the casing produces a tension on the cap and the downward pressure on the valve in order to effect a tight joint between the valve head and the valve seat washer.

The outstanding guide flange on the valve stem will last indefinitely, and insures a sturdy and dependable construction. To change the bottom washer one need only lift it out of the depression or recess, for there are no screws holding it in place that may break off when removing etc. This constitutes an easy way of overcoming a slight leak. Incidentally the packing ring and washer serve to provide leak-proof contact between the parts.

The handle can be removed without taking the structure apart for I provide a screw on the end of the square shank that extends out of the top to properly fasten the handle thereto, thereby making it simple to repair. These and other advantages and features have doubtless been made plain by the foregoing description and the accompanying drawings. Consequently, a more lengthy description is regarded unnecessary.

Having thus described my invention, what I claim as new is:—

1. In a household faucet of the class described, a casting including a valve casing including a body portion having a valve seat, a removable closing cap provided with a depending skirt, said body portion being screw threaded and provided with an annular channel, said depending skirt fitting telescopically in said channel, said cap also having an outstanding shoulder forming bead, a ring nut engaging said bead, and threaded upon said body portion, and a valve interposed between the cap and body portion, said valve being located in the casing and bearing upon the seat, whereby tightening of said nut will press the valve firmly against the valve seat.

2. In a faucet of the class described, a casting embodying a hollow body portion having an outstanding nozzle and a flanged attaching neck, said body portion also having a depression, being externally screw threaded at its top, having an annular channel, and a guide pin located in said channel, a removable valve seat washer in said depression, a valve encasing cap disposed upon said body portion, said cap having a skirt telescoping into said channel, and said skirt having a notch receiving said guide pin, a separable connection between the cap and body, and a rockably mounted valve in said casing including a head contacting said valve seat washer.

3. In a faucet of the class described, a hollow spherical valve casing including a valve seat, and a rockably mounted valve in said casing including a stem having an outstanding flange in movable contact with the interior of the top portion of the valve casing, said flange having a convex surface bearing against the correspondingly shaped surface of said top portion, a handle carried by the valve stem, and a head carried by the valve stem and cooperable with the valve seat.

4. In a faucet structure of the class described, a valve casing embodying a removable semi-spherical cap having an elongated slot formed in the central portion of its top, a valve unit in said casing embodying a stem including a portion extending through and beyond said slot, and a portion extending into the casing, the latter portion being reduced and screw threaded, a removable hollow valve head carried by said screw threaded portion, and an outstanding flange carried by the valve stem, said flange having a convex portion movably contacting the correspondingly shaped interior of said valve cap, together with a valve handle carried by said stem.

5. In a faucet structure of the class described, a valve casing embodying a valve seat, and a rockably mounted valve unit in said casing, said unit embodying a stem and an operating handle therefor, and a hollow valve head carried by and removably mounted on said stem, said head having a convex surface contacting the valve seat, being provided with a fluid intake slot and with a series of peripheral discharge ports in communication with said slot.

6. In a faucet structure of the class described, a valve casing embodying a valve seat, and a valve unit located in said casing and including a stem having a reduced screw threaded end, an intermediate outstanding flange provided with a convex bearing surface, and a polygonal portion extending through a slot in the complemental part of the valve casing.

7. In a faucet of the class described, a valve unit embodying a stem including a reduced screw threaded end portion, a hollow valve head carried by said portion, an outstanding integral intermediate flange provided with a convex bearing surface, a polygonal portion extending beyond the flange and terminating in a screw threaded extremity, and a handle carried by said screw threaded extremity.

In testimony whereof I affix my signature.

THOMAS LARRIGAN.